United States Patent [19]

Grantland et al.

[11] 4,447,674
[45] May 8, 1984

[54] ELECTRONIC HOLD RELEASE CIRCUIT

[75] Inventors: Gary Grantland, Hartselle; Hugh S. Montgomery, Huntsville; Eduard F. B. Boeckmann, Huntsville; Larry A. Woodworth, Huntsville, all of Ala.

[73] Assignee: GTE Automatic Electric Inc., Northlake, Ill.

[21] Appl. No.: 444,760

[22] Filed: Nov. 26, 1982

[51] Int. Cl.³ .............................................. H04M 1/00
[52] U.S. Cl. ................................. 179/81 R; 179/99 H
[58] Field of Search .................. 179/81 R, 81 C, 99 H

[56] References Cited

U.S. PATENT DOCUMENTS

| 4,001,520 | 1/1977 | Waldman et al. | 179/99 H X |
|---|---|---|---|
| 4,011,413 | 3/1977 | Phillips | 179/99 H X |
| 4,093,829 | 6/1978 | Silberman | 179/99 H X |
| 4,258,232 | 3/1981 | Smith et al. | 179/99 H X |
| 4,365,117 | 12/1982 | Curtis | 179/99 H |
| 4,387,274 | 6/1983 | Stein et al. | 179/81 R X |
| 4,394,543 | 7/1983 | Keiper, Jr. et al. | 179/99 H X |
| 4,394,544 | 7/1983 | De Leon | 179/99 H |

Primary Examiner—A. D. Pellinen
Assistant Examiner—Keith E. George
Attorney, Agent, or Firm—Anthony Miologos; Peter Xiarhos

[57] ABSTRACT

In a hold circuit including a silicon controlled rectifier (SCR) normally turned on and connecting the hold circuit to a subscriber line, a first hold release circuit outputs a trigger signal to a transistor turning off the transistor and disconnecting a line seizing network. A second hold release circuit outputs a trigger signal to a second transistor responsive to the line seizing network being disconnected. The second transistor connects a load resistor across the SCR dropping the holding current flowing through the SCR causing it to turn off. The second hold release circuit is also arranged to output its trigger signal to the second transistor responsive to a pre-arranged timing interval.

11 Claims, 1 Drawing Figure

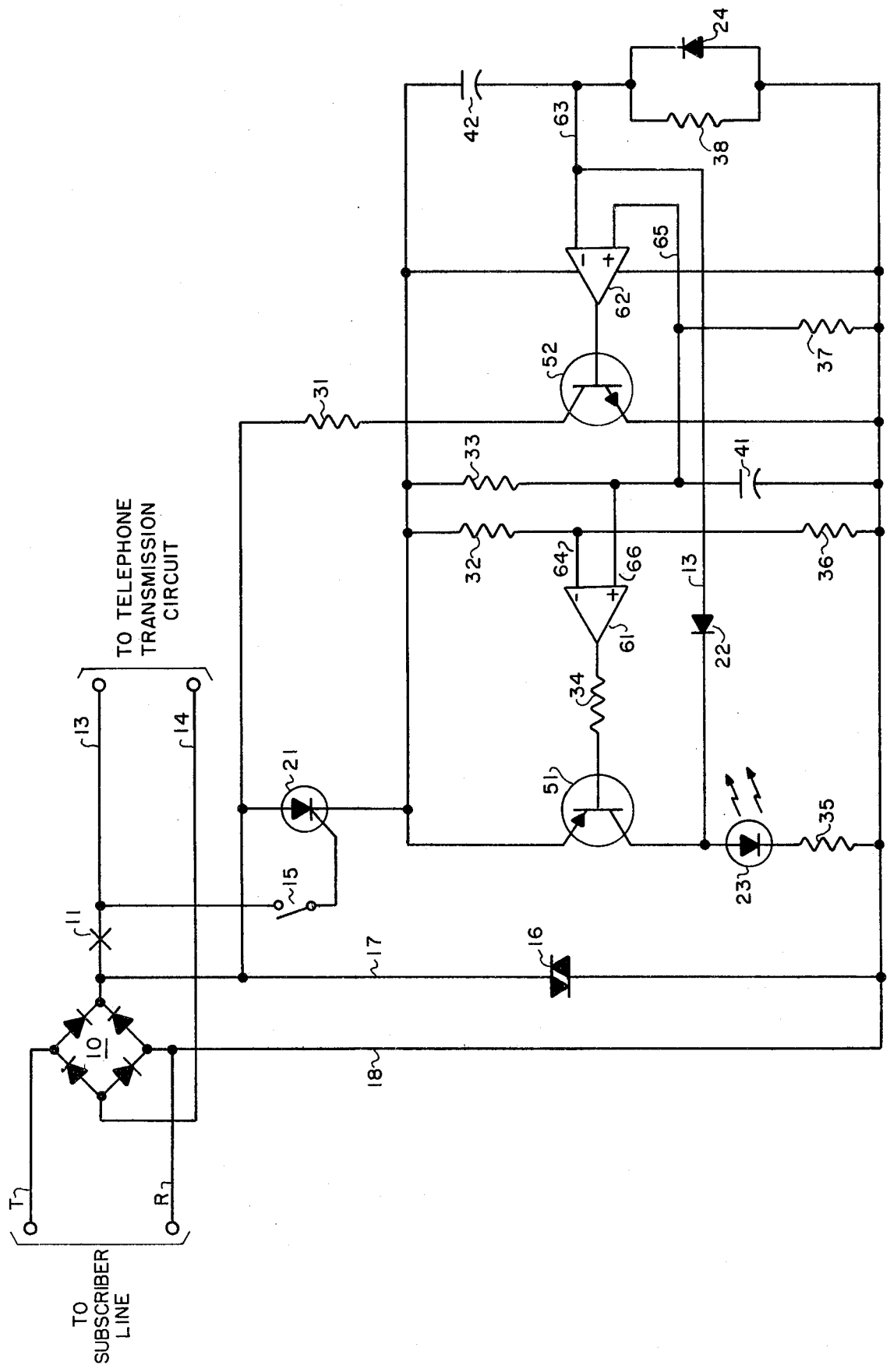

ELECTRONIC HOLD RELEASE CIRCUIT

CROSS-REFERENCE TO RELATED APPLICATIONS

The present application is related to copending U.S. Application Ser. No. 444,759 assigned to the same assignee.

FIELD OF THE INVENTION

This invention relates in general to telephone hold release circuits and more particularly to an improved electronic hold release circuit employing an artificial load simulating an extension telephone going "off-hook."

BACKGROUND OF THE INVENTION

In the course of receiving telephone calls, subscribers who have more than one local extension frequently find it necessary to shunt (i.e. put to one side or hold in abeyance) a call received on an incoming line until a desired party is called to the telephone or is transferred from one to another local extension. The shunting of such a call is more commonly known as "holding" of a call. For this purpose telephone instruments are provided with a hold circuit activated by a "hold" key or a "hold" button. By manipulating this key or button a subscriber is able to transfer an incoming call to a holding circuit instead of to a local telephone instrument. This holding circuit is essentially a shunting circuit which simulates the electrical characteristics of the subscriber's local telephone instrument. This allows the handset of the telephone initiating the hold to be replaced "on-hook." The hold will be released when any of the extension telephones on the initiating telephone are taken "off-hook."

Present electronic hold and hold release circuits which employ silicon controlled rectifiers (SCR) have problems in reliably holding the line on long loops, failing to drop the line when required, or maintaining excessive leakage current due to failure to cut off SCR holding current effectively.

Additionally, many present electronic hold circuits require a separate power source, usually from the 110 VAC power line, thereby creating a possible fire hazard.

SUMMARY OF THE INVENTION

The improved electronic hold and hold release circuit of the present invention is totally telephone line powered and includes SCR sensitive gate latching for operation on short or long telephone loops. Additionally, the circuit is varistor protected from lightning surges. The circuit will sense various types of high or low DC resistance telephone instrument extensions when going "off-hook," sensing a change in the DC voltage level in the telephone loop due to the additional current drawn by the extension telephone.

When the hold is activated by momentary contact closure (user function button), an automatic timing function starts. If an extension telephone is picked up before the circuit times out, the hold will be released. If no extension telephone, or the master phone, goes "off-hook" within a specified time (usually three to six minutes), the hold condition will automatically release.

In the hold release mode, an artificial load is connected to the telephone line to simulate an extension telephone going "off-hook." This is done by turning on a high voltage transistor with a resistor connected in parallel with the SCR. The load thus applied draws away the current that was flowing to the latched SCR, dropping it below its minimum holding current value and ensuring shut-off of the entire circuit.

DESCRIPTION OF THE DRAWING

The single sheet of drawing included herewith comprises a schematic diagram of the improved electronic hold and hold release circuit embodying the principles of operation of the present invention.

DESCRIPTION OF THE PREFERRED EMBODIMENT

The included drawing schematically shows the improved electronic hold and hold release circuit and elements well known and common to a telephone instrument. Line current is supplied to the hold circuit from the subscriber's line via the tip (T) and ring (R) leads and diode bridge network 10. Diode bridge 10 ensures that line current at the proper polarity is applied to the telephone transmission circuit (not shown) via leads 13 and 14 which are positive and negative, respectively, and to the hold circuit via leads 17 and 18 also positive and negative, respectively. A hookswitch contact 11 is included on lead 13 and is controlled by a typical hookswitch mechanism which is manually operable into an operated or "off-hook" condition, i.e. when the handset is lifted off the telephone instrument, or a non-operated, "on-hook" condition, i.e. when the handset is placed on the telephone instrument.

The improved electronic hold and hold release circuit of the present invention includes a first sensing device 61 comrpising a comparator or other like device having a negative input 64 connected to a voltage divider comprising resistors 32 and 36 and a positive input 66 connected to a second voltage divider comprising resistors 33 and 37. The output of sensing device 61 is connected to the base lead of a PNP transistor 51 via a current limiting resistor 34.

A second sensing device 62 comprising a comparator or other like device has a negative input lead 63 connected to an RC network consisting of capacitor 42 and resistor 38 and a positive input lead 65 connected to the aforementioned voltage divider comprising resistors 33 and 37. The output of sensing device 62 is connected to the base lead of an NPN transistor 52 which when turned on provides a current path from positive lead 17 of the hold circuit through a load resistor 31 (e.g. 100 ohms) to the hold circuit negative lead 18. Diodes 22 and 24 provide current steering during operation of the circuit, and capacitor 41 provides a stable voltage reference to leads 66 and 65 of sensing devices 61 and 62, respectively. Metal oxide varistor 16 is connected across leads 17 and 18 and provides voltage surge protection to the hold circuit.

A description of the operation of the improved electronic hold and hold release circuit will hereinafter be described in detail. It should be noted that the included drawing shows all contacts and switches in their unoperated conditions. With the telephone instrument operated, hookswitch contact 11 makes connecting telephone line current from the tip (T) and ring (R) leads to the telephone transmission circuit via leads 13 and 14 and to the hold circuit via leads 17 and 18. Initially, silicon control rectifier (SCR) 21 is in an off state as are transistors 51 and 52, thereby effectively disconnecting the hold circuit from the subscriber line.

When the telephone subscriber wishes to place a call on hold, pushbutton 15 is momentarily depressed, triggering SCR 21 into forward conduction connecting the positive potential of line 17 to the hold circuit. Resistors 33 and 37 and capacitor 41 charging through resistor 33 reflect the initial value of loop voltage and apply this voltage to leads 66 and 65 of sensing devices 61 and 62, respectively. Capacitor 41 will slowly update loop voltages for any fluctuations which may occur during the hold condition.

At this time, lead 66 of sensing device 61 is at a higher potential than lead 64 thereby placing device 61 in a low output state and turning transistor 51 on. With transistor 51 on, loop current is directed from positive line 17 through SCR 21, transistor 51, and LED 23 (which turns on indicating that the hold circuit is activated) and resistor 35 to the negative line 18. This effectively seizes the subscriber's line allowing the telephone instrument to be placed "on-hook" and disconnecting the transmission circuit. Capacitor 41 follows and charges to the increased loop voltage caused by the disconnection of the transmission circuit and applies the change in loop voltage to sensing device 61.

Lead 65 of sensing device 62 is also at a higher potential than lead 63 thereby outputting a low, turning transistor 52 off.

When an extension telephone or the master phone is taken "off-hook," negative lead 64 of sensing device 61 senses the drop in line voltage and becomes more negative in respect to the voltage referenced by capacitor 41. The output of sensing device 61 thereby goes high turning off transistor 51. The negative potential of line 18 is applied to lead 63 of sensing device 62 via diode 22 and line 13 making lead 63 more negative than the voltage applied to lead 65 by capacitor 41. The output of sensing device 62 also goes high turning transistor 52 on. Resistor 31 is then connected in parallel with SCR 21 thereby lowering the current flowing through SCR 21 to a level well below the SCR holding current value. As the SCR holding current drops, SCR 21 turns off disconnecting the hold circuit from the line.

In order to prevent the hold circuit from being activated for long periods of time an automatic hold drop is included. When SCR 21 is triggered turning on transistor 51 as discussed above, capacitor 42 charges to a negative potential through resistor 38. The RC time constant of resistor 38 and capacitor 42 determines a "time-out" period for the automatic release of the hold. When capacitor 42 has charged for approximately one time constant, lead 63 of sensing device 62 becomes more negative than lead 65, which is referenced to loop voltage by capacitor 41. The output of sensing device 62 therefore goes high turning transistor 52 on. When transistor 52 turns on, load resistor 31 is connected in parallel with SCR 21 providing simulation of an extension telephone going "off-hook." As the current through SCR 21 decreases the subsequent voltage drop is sensed by resistors 32 and 36 and applied to lead 64 of sensing device 61. The output of device 61 then goes high turning off transistor 51. To ensure positive cutoff of all current to the hold circuit, lead 63 of device 62 is connected to the collector side of transistor 51 via diode 22 and line 13 thereby connecting lead 63 to the negative potential of line 18 ensuring that lead 63 remains more negative in respect to lead 65. Load resistor 31 draws away SCR current until SCR 21 falls below a minimum SCR holding value turning off SCR 21 and loop current to the hold circuit.

It will be obvious to those skilled in the art that the time in which the hold circuit times out may be adjusted by substituting different values for resistor 38 and capacitor 42.

Although the best mode contemplated for carrying out the present invention has been herein shown and described, it will be apparent that modifications and variations may be made without departing from what is regarded as the subject matter of the invention.

What is claimed is:

1. A hold release circuit for use with at least one telephone instrument and a hold circuit, said hold circuit connected to a subscriber line and a source of line voltage and said telephone instrument disconnected from said subscriber line, said hold release circuit comprising:

first and second switching devices normally turned on connecting said hold circuit to said subscriber line;

sensing means connected to said second switching device arranged to produce an output signal responsive to said telephone instrument being connected to said line, turning said second switching device off; and load circuit means connected to shunt said first switching device responsive to said second switching device turning off, causing said first switching device to turn off and release said hold circuit.

2. A hold release circuit as claimed in claim 1, wherein: said sensing means comprises a comparator circuit including first and second inputs and said first input is connected to a voltage divider connected across said subscriber line, said voltage divider including a capacitor which charges to and provides an output representative of said line voltage, and said second input is connected to a second voltage divider, wherein responsive to said telephone instrument being connected to said line said second input becomes more negative than said first input, and said comparator provides an output signal.

3. The hold release circuit as claimed in claim 1, wherein: said first switching device is a silicon controlled rectifier and said load circuit means comprises a transistor turned on by said second switching device turning off, connecting a resistor across said telephone line and in parallel with said silicon controlled rectifier.

4. A hold release circuit for use with at least one telephone instrument and a hold circuit, said hold circuit connected to a tip lead and a ring lead of a subscriber telephone line and a source of line voltage and current, and said telephone instrument disconnected from said subscriber line, said hold release circuit comprising:

a silicon controlled rectifier and a first transistor device connected in series, said silicon controlled rectifier and first transistor normally turned on providing an electrical path for said line current from said tip lead through said hold circuit to said ring lead for connecting said hold circuit to said subscriber line;

a first sensing circuit including first and second line sensors, each sensor providing an output representative of said line voltage, said first sensing circuit responsive to said telephone instrument connected to said subscriber to produce an output signal turning off said first transistor;

a second sensing circuit including a first input connected to said first transistor coupling the potential of said ring lead to said second sensing circuit when said first transistor is turned off and a second input connected to said second line sensor, said second sensing circuit producing an output signal responsive to said second input having a greater electrical potential on said first input; and a load circuit including a resistor and a second transistor connected in series, said second transistor turning on responsive to said second sensing circuit output signal, providing a shunt path for said line current thereby turning off said silicon controlled rectifier and releasing said hold circuit.

5. The hold release circuit as claimed in claim 4, wherein: said first sensing means comprises a comparator device and said line sensors comprise first and second voltage dividers, and said second voltage divider includes a capacitor which retains the highest value of line voltage sensed, whereby said comparator device produces an output signal responsive to said first voltage divider providing an output less than said second voltage divider.

6. The hold release circuit as claimed in claim 4, wherein: said second sensing circuit comprises a comparator device including said first and second inputs, said first input connected to said first transistor emitter lead for connecting the negative voltage of said ring lead to said comparator when said first transistor is turned off.

7. A hold release circuit for use with at least one telephone instrument and a hold circuit, said hold circuit connected to a tip lead and a ring lead of a subscriber telephone line and a source of line voltage and current, said hold release circuit comprising:

a silicon controlled rectifier and a transistor device connected in series, said silicon controlled rectifier and transistor normally turned on providing an electrical path for said line current from said tip lead through said hold circuit to said ring lead for connecting said hold circuit to said subscriber line;

hold release time-out means connected across said subscriber line arranged to provide a time-out period and to produce an output signal when said time-out period is obtained;

a first sensing circuit turned on by said time-out means output signal connecting a load circuit means across said silicon controlled rectifier, shunting the majority of line current therethrough; and a second sensing circuit producing an output signal turning off said transistor responsive to the additional load provided by said load circuit means across said subscriber line, causes said silicon controlled rectifier to turn off and release said hold circuit.

8. The hold release circuit as claimed in claim 7, wherein: said time-out means comprises a resistor and capacitor connected in series across said line and said capacitor charges through said resistor to said line voltage at a predetermined rate.

9. The hold release circuit as claimed in claim 7, wherein: said first sensing means comprises a comparator device having a first input connected to said time-out means and a second input connected to a first voltage network comprising a pair of resistors and a capacitor, said capacitor charging to the highest line voltage sensed, and said comparator arranged to provide said output signal when said first input lead becomes more negative than said second input lead.

10. The hold release circuit as claimed in claim 7, wherein: said load circuit means includes a resistor and transistor connected in series across said silicon controlled rectifier providing a shunting path for said line current when said load circuit transistor is turned on by said first sensing circuit.

11. The hold release circuit as claimed in claim 9, wherein: said second sensing circuit includes a comparator device having a first input connected to said first voltage network and a second input connected to a second voltage divider comprising a pair of resistors and said comparator producing an output signal to said transitor device in response to said first voltage divider sensing said load circuit means connected across said line.

* * * * *